Nov. 12, 1957     N. J. ALLBRIGHT     2,812,792
SLICED PRODUCT MEASURING AND SEGREGATING APPARATUS
Filed Sept. 23, 1954     6 Sheets-Sheet 1

Fig.1

Inventor
Norman J. Allbright
By: Kane, Dalsimer and Kane
Attys.

Nov. 12, 1957  N. J. ALLBRIGHT  2,812,792
SLICED PRODUCT MEASURING AND SEGREGATING APPARATUS
Filed Sept. 23, 1954  6 Sheets-Sheet 6

Inventor
Norman J. Allbright
By: Kane Dalsimer and Kane Attys

United States Patent Office 2,812,792
Patented Nov. 12, 1957

2,812,792

SLICED PRODUCT MEASURING AND SEGREGATING APPARATUS

Norman J. Allbright, Hinsdale, Ill., assignor, by mesne assignments, to Cashin, Inc., a corporation of New York Application September 23, 1954, Serial No. 457,863

13 Claims. (Cl. 146—1)

This invention relates to improved apparatus for measuring and segregating predetermined quantities of sliced products coming from a slicing machine.

Prior to the invention of the aforesaid patent application, it was common commercial practice to operate a food slicing machine continuously and to discharge the slices of bacon, luncheon meats, or other products, upon a conveyor leading from the machine. Operators stationed along the conveyor segregated the slices for packaging into separate measured quantities usually of preselected weight. Since the weight of the segregated quantities must be held within close tolerances the work of accurately measuring and segregating the precise predetermined quantities was tedious and time consuming and accordingly costly.

The invention of the above identified patent application eliminated the time consuming and costly manual operations heretofore required and provided improved apparatus for automatically measuring and segregating sliced food products coming from slicing machinery.

It is an object of the present invention to provide certain improvements, modifications and refinements in the apparatus of the aforesaid prior patent application and to provide improved measuring and segregating apparatus for sliced food products which is flexible and may be readily adjusted; which may be used with different types of food products; which does not interfere with the manual control of the slicing machine to which it is applied; in which the food engaging parts are accessible and can be readily cleaned; and which is of relatively simple and sturdy construction so that it is relatively simple to manufacture, assembly and use, and requires a minimum amount of repair.

In the accompanying drawings—

In the accompanying drawings I have shown my improved measuring and segregating apparatus 10 applied to the discharge end of a slicing machine 11 so that the sliced products from the slicing machine are discharged on the receiving platform of my apparatus and measured and the measured quantities are then segregated by means of a transfer belt from the other sliced products coming from the slicing machine.

Slicing machine

My improved apparatus may be used with many different types of slicing machines. The drawings illustrate one type of slicing machine to which my machine is particularly applicable. However, it should be understood that the illustrated slicing machine does not per se constitute my present invention.

The illustrated slicing machine is available commercially under the name Hydromatic Slicer and is fully disclosed in the operating instruction for the Anco No. 827 Hydromatic Bacon Slicer (revised May 14, 1952) published by the manufacturer, The Allbright-Nell Company of Chicago, Illinois.

The relevant portions of the slicing machine are shown more particularly in Figs. 1 to 5 inclusive and comprise a supporting table 12 having a platen or feed bed 13 over which the product such as meat loaf or luncheon meat shown at 14 is fed by a pusher 15 to the slicing blade 16 to be sliced and then discharged onto my measuring and segregating apparatus 10.

Figure 1:
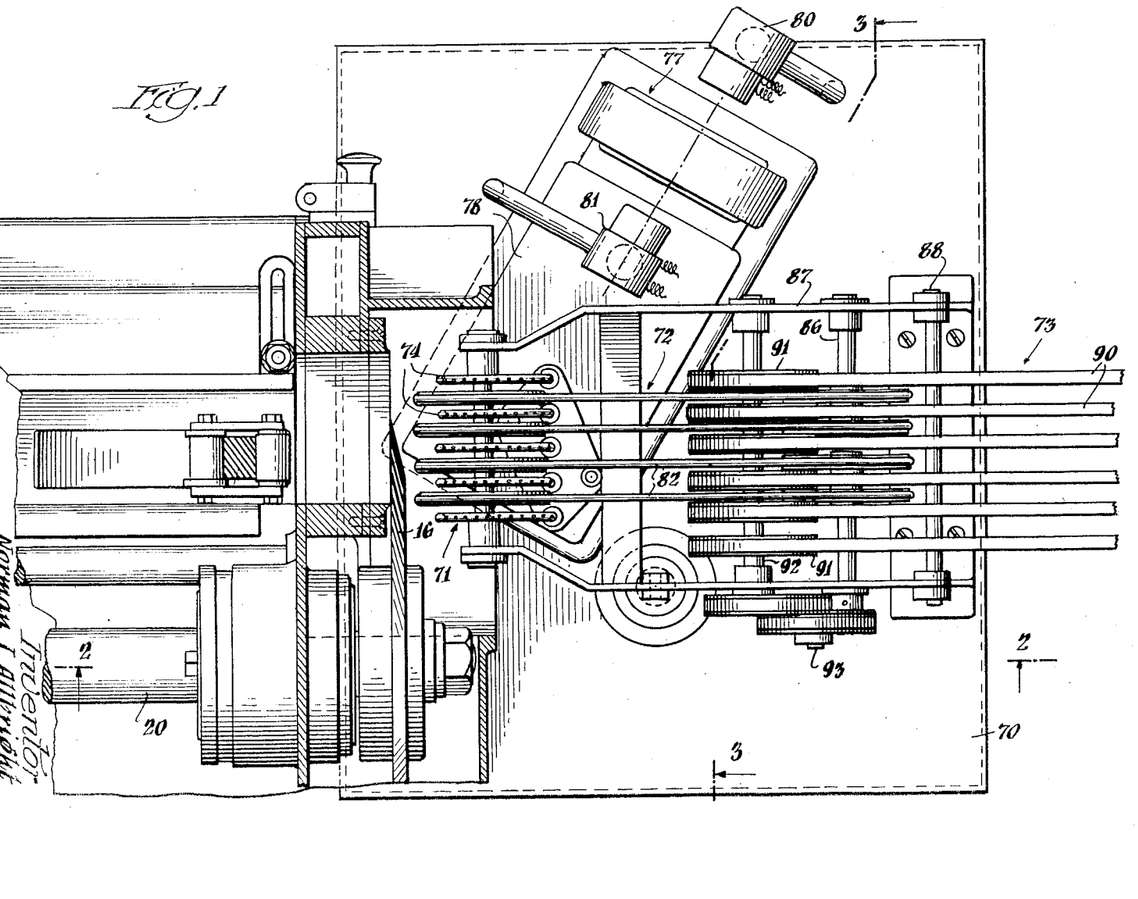
Fig. 1 is a plan view of measuring and segregating apparatus embodying my invention showing the trailing end of a slicing machine and the leading end of a ribbon type conveyor with which the apparatus is associated.
Figure 2:
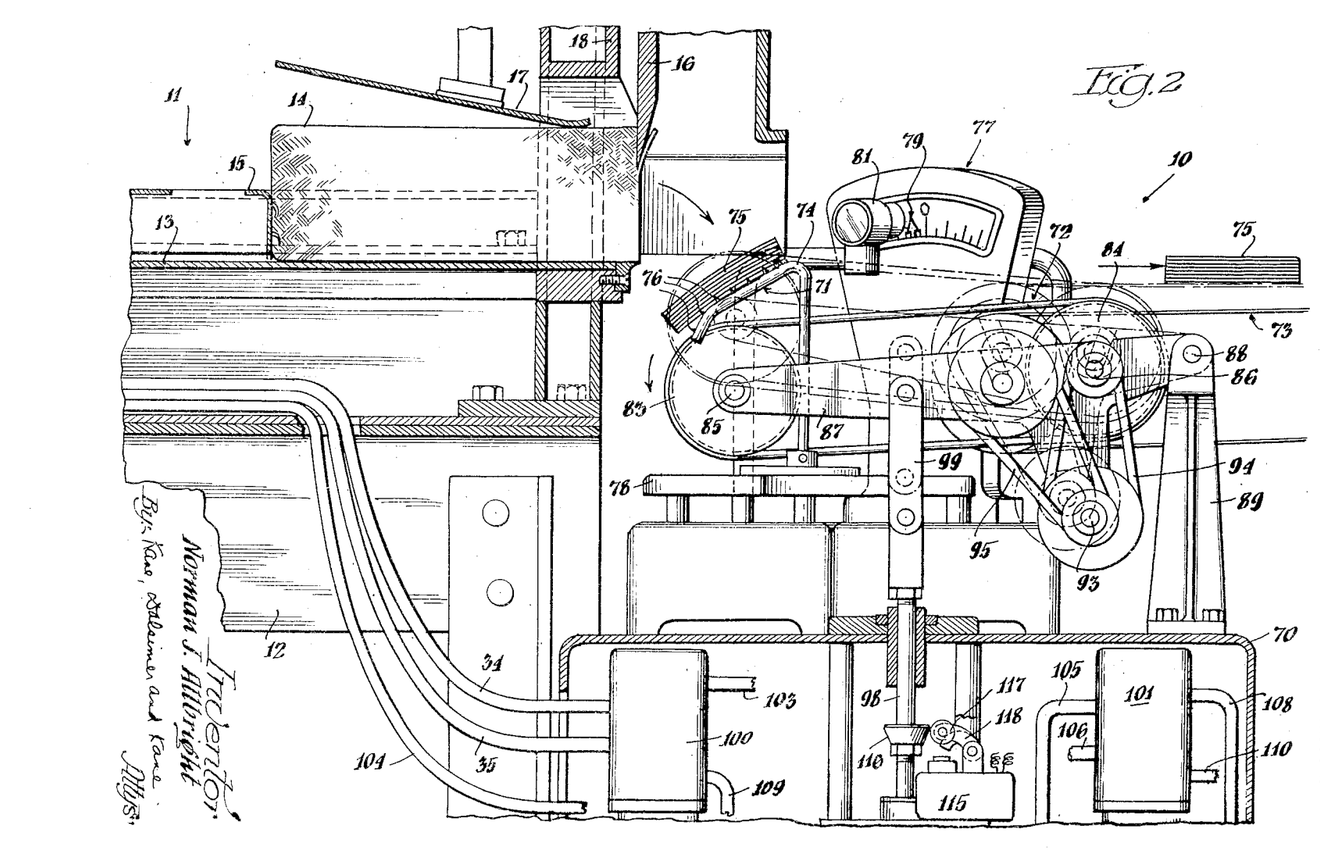
Fig. 2 is a longitudinal sectional view of the apparatus in the direction of the arrows on the line 2—2 of Fig. 1.
Figure 3:
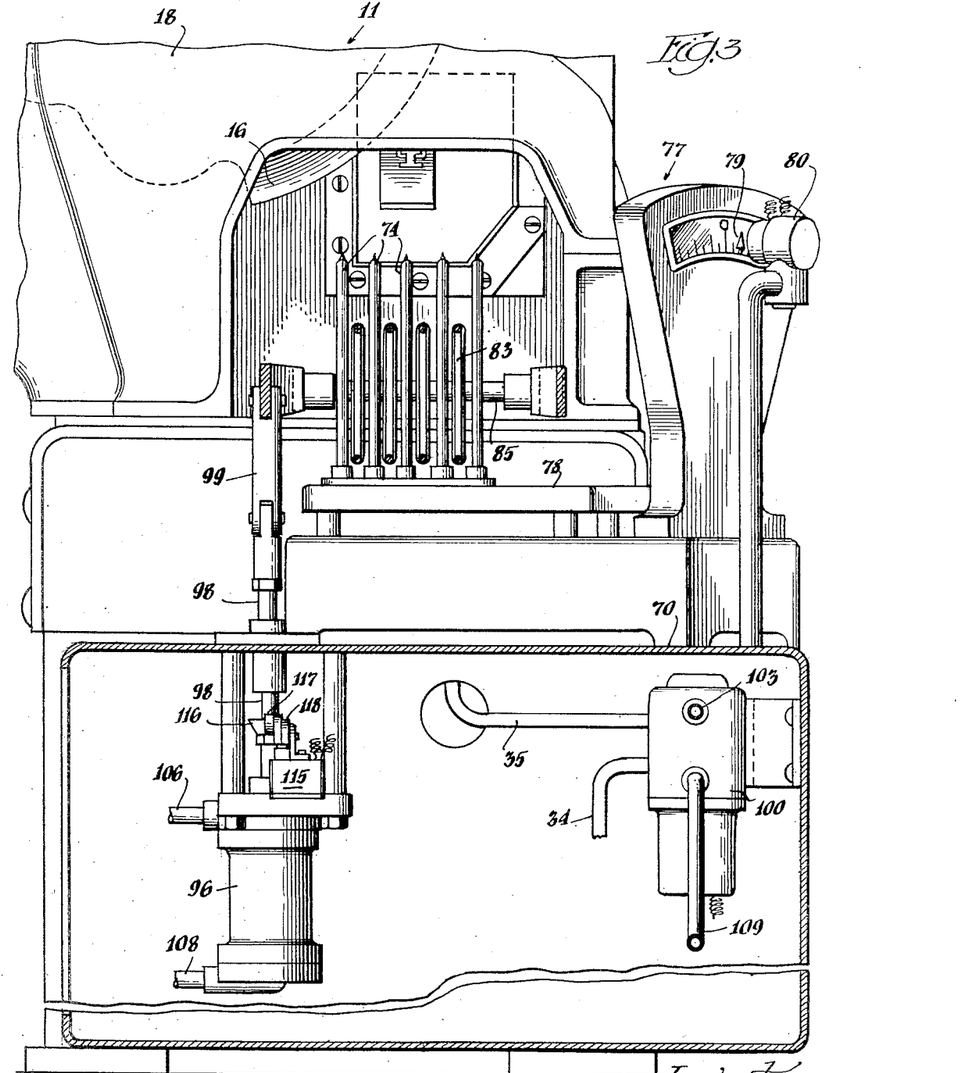
Fig. 3 is a cross-sectional view of the apparatus in the direction of the arrows on the line 3—3 of Fig. 1.

The forward or leading edge of the meat product 14 is pressed downwardly against the bed so as to properly engage the blade for slicing by means of the spring pressure plate 17 suitably supported adjacent the blade as shown in Fig. 2. The blade is encased in a housing 18 which serves to protect the operator and also prevent the articles of sliced product from being thrown outwardly from the blade by centrifugal force.

The blade is one conventional type of rotary cutting blade and is in the form of an eccentric disc which is rotated at high speed. The portion of the blade having the greatest radius serves to slice the leading edge of the product while the portion of the blade having the minimum radius provides clearness for the product to be fed outwardly permitting the initiation of the next slicing operation. The product is slowly and continuously fed forwardly by the pusher 15 and each cycle of rotation of the blade produces another slice. When the pusher feeds the product forwardly at a relatively higher rate of speed, the thickness of the slice is increased and when the pusher operates at a relatively lower rate of speed the thickness of the slice is reduced.

The blade is mounted at the end of a rotatable shaft 20 and the shaft, in turn, may be driven by electric motor 21 through suitable driving mechanism (not shown). Motor 21 also operates hydraulic pump 25 (see Fig. 5) which provides the hydraulic fluid under pressure for the operation of the hydraulic mechanism. In this connection, the pusher arm 15 is reciprocated by hydraulic cylinder 26 through piston 27 which is operatively connected to the pusher arm as shown most clearly in Fig. 5.

When motor 21 is operated it causes the rotation of the knife blade and also the operation of the hydraulic pump 25 so as to generate the necessary hydraulic pressure for the operation of the remaining mechanism. The pusher arm 15 is caused to reciprocate by means of the handle 28 of control valve 29. When the handle is pushed inwardly it causes the reciprocation of pusher 15. When it is pulled outwardly it stops the reciprocation of the pusher.

Figure 5:
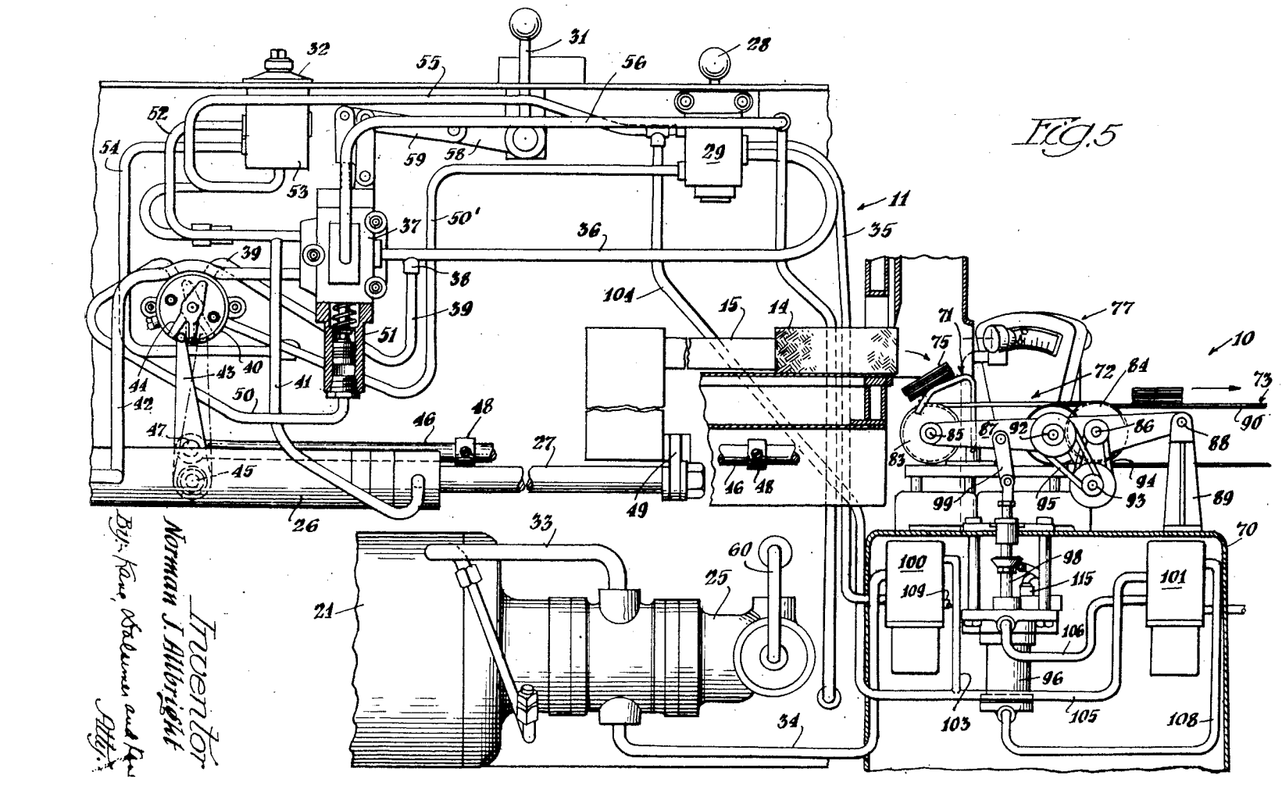
Fig. 5 is a detailed, partially diagrammatic view of the hydraulic circuit for actuating the slicing machine and the interconnected hydraulic mechanism of my improved measuring and segregating apparatus and also showing schematically the associated mechanical parts of the apparatus.

Control lever 31 mounted on the side of the slicing machine causes the rapid traverse or shifting of the pusher in either direction. When the lever is in neutral or center position as shown in Fig. 5, the pusher reciprocates normally. When it is desired to shift the pusher rapidly in a forward direction the lever is shifted towards the blade i. e. towards the right as viewed in Fig. 5. When it is desired to cause the pusher to retract or shift in a rearward direction the lever 31 is shifted away from the blade i. e., to the left as viewed in Fig. 5.

A suitable feed control dial 32 is also provided on the side of the slicing machine. Rotation of the dial in one direction causes the speed of the pusher in a forward direction to be increased and rotation of the dial in the opposite direction similarly causes the feed of the pusher in a forward direction to be decreased.

Hydraulic circuits for the slicing machine

The hydraulic circuits for causing the reciprocation of piston 27 in cylinder 26 and whereby the various controls 28, 31 and 32 are caused to operate are shown in Fig. 5. Thus, the hydraulic pump 25 pumps the hydraulic fluid from the supply tank through line 33. From the pump the fluid is pumped through line 34 to the control mechanism of my improved measuring and segregating apparatus 10. The arrangement and operation of the hydraulic mechanism of my improved measuring and segregating apparatus will be hereinafter described. Suffice it to say for the time being that from the hydraulic control mechanism of my apparatus the pressure fluid passes through tube 35 to the main on-and-off control valve 29.

Figure 8:
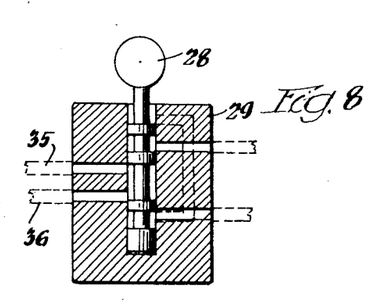

Since the slicing machine does not constitute my present invention and since the illustrated slicing machine is one commercially available and known type of slicing machine, it is sufficient for our present purposes to state that control valve 29 is suitably connected through hydraulic tubes, fittings and valves to the cylinder 26 so that when the handle 28 is pressed inwardly to the position shown in Fig. 8, the piston 27 and pusher arm 15 will be caused to reciprocate, shifting to the right as viewed in Fig. 5, so as to feed the meat product forwardly to be sliced by the blade 16. When the meat product has been shifted to the right so that all of it has been sliced, the piston and pusher arm are automatically retracted and then automatically start feeding forwardly again.

The hydraulic connections are also such that by rotating the dial 32 in one direction the feeding of the pusher arm in a forward direction can be accelerated and by rotating the dial in an opposite direction it can be slowed down. Also, as previously stated, by pushing the lever 31 in one direction the pusher arm is retracted and by shifting the lever 31 in the opposite direction it is fed forwardly at an accelerated rate of speed.

Figure 7:
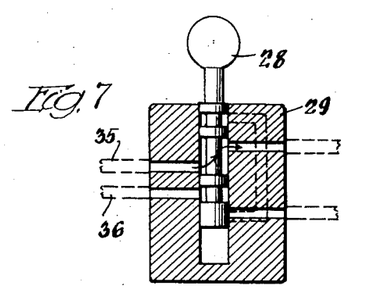
Figs. 7 and 8 are longitudinal sectional views of the control valve and handle for controlling the operation of the slicing machine and showing the valve respectively in operative position and in normal operating position as when the slicing machine is in operation.

The following description of the hydraulic connections and fittings is provided for those who are interested in obtaining a more complete understanding of the hydraulic mechanism. As will be seen by reference to Figs. 5, 7 and 8, hydraulic fluid entering the control valve through line 35 will flow outwardly through line 36 to the spring centered reversing valve 37 when handle 28 is pushed inwardly. In addition to flowing to the spring centered reversing valve oil from line 36 passes through coupling 38 and line 39 to pilot valve 40. Oil entering the reversing valve 37 may leave through line 41 to the forward end of cylinder 26 to cause the pusher to retract away from the blade or it may leave through line 42 so as to enter the rear of cylinder 26 and thereby cause the pusher to feed forwardly toward the cutting blade.

Pilot valve 40 controls the reversing valve 37 so as to determine whether the hydraulic fluid will exit through the line 41 or the line 42. The pilot valve 40 in turn is controlled by the reciprocation of the pusher. Thus, the lever arm 43 which controls the position of the pilot valve 40 through interengagement with the finger lever 44 is pivotally mounted to the frame at 45 and to the pilot control rod 46 at the point 47. The pilot rod 46 is longitudinally reciprocal and has a pair of adjustable collars 48 near the opposite limits of movement of the pusher which are engaged by the arm 49 at the two extreme limits of movement so as to shift the pilot rod 46 in the direction of movement of the pusher. Thus, when the pusher is shifted to the left, pilot rod 46 will shift to the left when arm 49 engages collar 48 thereby pushing the arm 43 to the left and rotating pilot valve 40 to the position shown in full lines in Fig. 5. When the pilot valve is in this position the hydraulic fluid coming through line 39 is blocked by the pilot valve and cannot exit through line 50 to the control portion 51 of reversing valve 37. Under those circumstances the spring centered reversing valve 37 is in its centered position and causes the hydraulic fluid entering the reversing valve 37 to exit through line 42 to the rear portion of the hydraulic cylinder with the result that the piston and pusher are fed towards the cutting blade.

When the pusher shifts to the desired forward limit of movement arm 49 will engage the other collar 48 shifting the pilot rod 46 to the right with the result that arm 43 is pivoted to the right causing the pilot valve 40 to assume the position shown in dotted lines. Under those circumstances, the pilot valve is opened to permit flow of the hydraulic fluid under pressure through line 39, pilot valve 40, line 50 to the control portion 51 of reversing valve 37. The hydraulic pressure from line 50 entering the control portion 51 shifts the control inwardly against the force exerted by the spring with the result that hydraulic fluid from the reversing valve exists through the line 41 and enters the forward end of the hydraulic cylinder 26 causing the piston and pusher to shift rearwardly away from the blade.

This cycle of operation with automatic reversing continues so long as control valve 29 remains open. The speed at which the pusher shifts in a forward or feeding direction is controlled by feed control 32. Thus, as the piston 27 in cylinder 26 is shifted to the right as viewed in Fig. 5, the hydraulic fluid in the forward part of the cylinder must exit through line 41. Reversing valve 37 is so constructed that the fluid leaving the cylinder through line 41 cannot pass through the reversing valve when it is centered, but must flow through line 52 to the feed control valve 53. By rotating the feed control dial 32 the size of a pressure balanced orifice opening in the feed control valve can be increased or decreased so as to increase or decrease the flow of hydraulic fluid outwardly through line 54 and back to the reservoir or supply tank. By enlarging the opening, it will be appreciated that the speed of the feed is increased. By decreasing the size of the opening the speed of the feed is decreased. Control valve 29 is connected by a line 55 to feed control 53. The control valve 29 permits the fluid pressure to pass through the line when the valve 29 is closed. This maintains a constant pressure in the feed control valve 53 so as to prevent any lag and a resultant increase in the size of the slices upon each reversing in the direction of movement.

Feed control valve 53 does not serve to control the speed of the pusher in a rearward direction. When piston 27 shifts in cylinder 26 to the left, as viewed in Fig. 5, the hydraulic fluid to the left of the piston exits through line 42 and is permitted to flow through reversing valve 37, when the control has been shifted inwardly by fluid pressure at 51, and the fluid flows outwardly to return line 56 from which it re-enters the reservoir or supply tank.

When control lever 31 is pivoted rearwardly, through the action of cranks 58 and 59, it causes reversing valve 37 to assume the same position as when fluid pressure is applied to the control portion 51. In other words, it causes fluid under pressure to pass through the reversing valve and thence through line 41 to the forward portion of cylinder 26. The hydraulic fluid at the rear of the cylinder can leave through line 42 and thence pass through reversing valve 37 and through return line 56 to the reservoir.

When the lever 31 is pivoted forwardly or to the right as viewed in Fig. 5, it causes the fluid under pressure to pass through reversing valve 37 and line 42 to the rear portion of cylinder 26. The fluid returning from the forward portion of the cylinder through line 41 need not pass through the feed control valve 53 but can now pass through reversing valve 37 through return line 56 to the reservoir. This permits the pusher to travel at a much greater rate of speed.

A relief line and valve 60 is provided between the end of the hydraulic pump 25 and the reservoir so as to prevent too much pressure from building up in the hydraulic system. The relief valve can be adjusted to the desired pressure as, for instance, 150 pounds.

The slicing machine and the hydraulic control circuits, as shown and described are illustrative of the type of device to which my measuring and segregating apparatus may be applied. As stated above, the slicing machine is commercially available and does not per se constitute my invention.

*Measuring and segregating apparatus*

My improved measuring and segregating apparatus, is shown primarily in Figs. 1 to 5 inclusive, and comprises a supporting table 70 on which is mounted a fixed receiving platform 71, a relatively high speed conveyor 72 and the leading end of a ribbon conveyor 73.

The receiving platform is positioned adjacent the discharge end of the weighing machine so that the slices coming therefrom are discharged thereon. When a predetermined, measured amount of the slices are accumulated on the receiving platform they are then transferred by the high speed transfer conveyor 72 to the conveyor 73. For this purpose, I arrange the receiving platform and the transfer conveyor in intermeshed relationship with the receiving platform being normally disposed in a relatively higher horizontal plane than the transfer conveyor. When a predetermined quantity of the product has accumulated on the receiving platform, then the transfer conveyor and receiving platform are shifted relative to each other so that the transfer conveyor occupies a position in a higher horizontal plane than the receiving platform and transfers the accumulated sliced product therefrom to the conveyor 73.

The receiving platform is preferably made of substantially parallel bars or rods 74 arranged in spaced relationship. They are suitably supported at their lower ends and extend vertically upwardly and then downwardly at an angle towards the leading end of my apparatus. Immediately adjacent their free ends the rods or bars are preferably turned downwardly at a relatively sharper angle. The angularly disposed surfaces of the rods or bars form the receiving platform and the sliced meat product is discharged thereon, as shown at 75 in Figs. 2 and 5. By arranging the receiving platform at a slight angle facing towards the discharge end of the slicing machine the slices are caused to stack in superimposed relationship as shown. So as to retain the slices in place and prevent them from sliding off the platform, I preferably provide the rods or bars with projections which engage the lower slices, as shown at 76.

As previously indicated, I provide my apparatus with improved measuring means for measuring predetermined quantities of the sliced product. I may use various types of measuring devices for this purpose but I find that a scale 77 of the over and underweight type serves very satisfactorily. The lower ends of the rods 74 of my receiving platform are mounted on the platform 78 of the scale so that the product discharged on the receiving platform is weighed by the scale. As stated, the illustrated scale is of the over and underweight type and is adjusted to the desired weight. When the desired quantity of product is accumulated on the scale, pointer 79 points to the —0— at the center of the scale face.

Associated with the scale is suitable switch mechanism which, when the proper weight is registered, actuates the transfer mechanism and simultaneously stops the operation of the pusher arm which feeds the meat product to the knife blade. One convenient type of switch mechanism comprises a photoelectric cell 80 located on one side of the central portion of the dial face of the scale and a light beam source 81 on the opposite side and focused on the photoelectric cell 80. When the pointer 79 points to the —0— at the center of the dial face, it interrupts the light beam and actuates the electrical circuits.

The high speed transfer belt 72 comprises a plurality of spaced parallel endless belts 82 extending between and mounted on the spaced pulleys 83 and 84 which, in turn, are mounted on shafts 85 and 86. The shafts 85 and 86 are journaled in opposite sides of a cantilever-type frame 87 which is pivotally mounted at one end as shown at 88 upon standards 89 supported on table 70. The opposite end of the frame is free and can shift upwardly and downwardly.

During normal operation the transfer conveyor 72 is arranged in a substantially horizontal plane lower than the plane of the receiving platform 71 and the pulleys 83 and the leading ends of the belts 82 are interposed between the bars or rods 74 of the receiving platform, as shown in Fig. 5 and in full lines in Fig. 2. During the transfer or segregating cycle, the supporting cantilever frame 87 is pivoted upwardly so that pulleys 83 and the leading ends of the belts 82 are positioned in a horizontal plane higher than the receiving platform as shown in dotted lines in Fig. 2, with the result that the sliced food product on the receiving platform will be picked up by the transfer conveyor and shifted towards the trailing end of the apparatus as indicated at 75' in Fig. 2.

The belts 82 forming the transfer conveyor 72 may be of any desired type and may be made of various materials such as stainless steel. However, I have found that belts which are circular in cross-section and made of synthetic or natural rubber serve very satisfactorily for this purpose.

The ribbon conveyor 73 is formed of a plurality of spaced parallel ribbon or strip type endless belts 90 and are suitably supported on pulleys 91 mounted on shaft 92 journaled in the two sides of the frame member 87, a short distance forwardly of the shaft 86. The opposite ends of the belts 90 are supported on similar pulleys at a spaced distance from my apparatus.

The belts of both conveyors may be driven from a common drive shaft 93 connected to a suitable electric motor (not shown). As previously indicated, the transfer conveyor is preferably driven at a relatively higher speed than the ribbon conveyor 73 and this may be accomplished by drive belt 94 connected between a relatively large pulley on shaft 93 and a relatively small pulley on shaft 86 and belt 95 connected between a relatively small pulley on shaft 93 and a relatively large pulley on shaft 92.

The transfer conveyor 72 and the ribbon conveyor 73 are disposed in substantially the same plane so that stacked slices on the transfer conveyor will be readily transferred to the ribbon conveyor. Also, due to the fact that the leading end of the ribbon conveyor is supported on the pivoted cantilever frame 87, the ribbon conveyor will pivot upwardly with the transfer conveyor and maintain the same relative relation.

I have previously indicated that when the pointer 79 interrupts the light beam focused on the photoelectric cell, electrical circuits are actuated which cause the relative shifting of the transfer conveyor. The specific mechanism whereby the cantilever frame 87 is pivoted upwardly to elevate the transfer conveyor preferably takes the form of a hydraulic cylinder 96 having piston 97 therein connected by piston rod 98 and link 99 to the side of the frame. When piston 97 is in its lowermost position the frame and transfer conveyor assume the substantially horizontal normal operating position shown in Fig. 5 and in full lines in Fig. 2. When the piston shifts upwardly in the cylinder the frame and transfer conveyor assume the transfer position shown in dotted lines in Fig. 2.

As previously indicated, the hydraulic fluid is pumped under pressure from pump 25 through line 34 to my improved measuring and segregating apparatus. The flow of the fluid so as to cause the raising and lowering of the transfer mechanism and the operation of the feed mechanism of the slicing machine is controlled by solenoid valves 100 and 101. The construction of these valves is shown in Figs. 9 through 12 and the hydraulic circuit is shown in Figs. 1, 3, 4 and 5.

Figure 9:
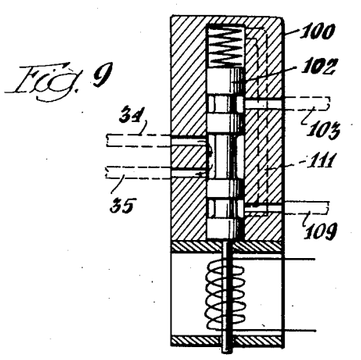
Figs. 9 and 10 are longitudinal sectional views of the solenoid valve used in my improved apparatus for initiating the sequence of operations during the transfer cycle and showing the valve respectively in normal operating position so as to cause the operation of the slicing machine and in segregating position so as to halt the operation of the slicing machine and activate the transfer mechanism.
Figure 10:
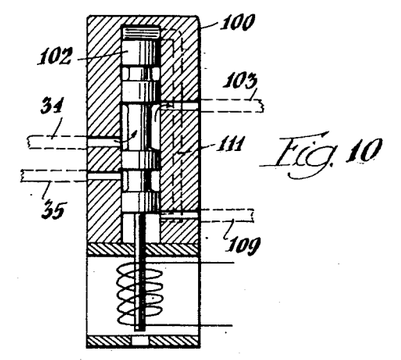
Figure 11:
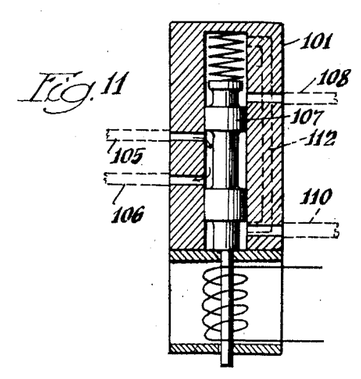
Figs. 11 and 12 are longitudinal sectional views of the solenoid valve used in my apparatus for controlling the hydraulic cylinder and piston and showing the valve respectively in normal operating position to retain the piston in lowermost position and in measuring and segregating position so as to cause the piston to elevate and thereby activate the transfer mechanism.
Figure 12:
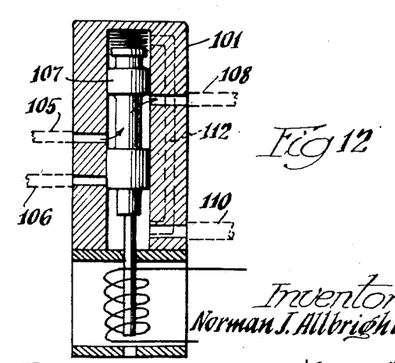

When the solenoids of the valves are de-energized they assume the positions shown in Figs. 9 and 11. When the solenoids are energized they assume the position shown in Figs. 10 and 12. Thus, when the solenoid valve 100 is de-energized, as shown in Fig. 9, the hydraulic fluid entering the valve through line 34 is directed through line 35 to control valve 29 of the slicing machine. Under the circumstances, when control handle 28 is shifted inwardly, the feed mechanism will operate.

However, when the solenoid of valve 100 is energized the armature and valve piston 102 are shifted upwardly with the result that the hydraulic fluid from line 34 can no longer flow through line 35, but instead flows outwardly through line 103. The stopping of the flow of fluid through line 35 immediately cuts off the supply of fluid under pressure to control valve 29 with the result that the feed mechanism of the slicing machine is halted. Line 103 branches into two sections 104 and 105. Line 104 connects with line 55 so as to balance the pressure in flow control valve 53 during the period that the operation of the feed mechanism is halted.

The fluid under pressure in line 105 enters valve 101 and if the solenoid of valve 101 is de-energized, it will be seen from Fig. 11 that the hydraulic fluid can flow outwardly from the valve through line 106 which connects with the upper end of piston 96 so as to lower the transfer mechanism. When the solenoid of valve 101 is energized, then the armature and valve piston 107 shifts upwardly to the position shown in Fig. 12 with the result that the flow of hydraulic fluid through line 106 to the upper end of cylinder 96 is shut off, and the fluid from the valve then flows outwardly through line 108 to the lower end of cylinder 96 causing the piston and transfer mechanism to shift upwardly to transfer position.

The valves 100 and 101 both have lines 109 and 110 leading to the reservoir tank of hydraulic fluid. They also have bypasses 111 and 112 within the valve structure which permits the fluid on the low pressure side of piston 97 to be returned to the tank when the piston is shifted.

A further portion of the control and actuating mechanism for my apparatus is to be found in the sensitive quick-acting switch, such as a micro-switch, indicated at 115 which is mounted on the apparatus adjacent to piston rod 98. During normal operation of the apparatus while the transfer mechanism is in its lowermost position, the switch is held in open position by means of tapered cam collar 116 mounted on piston rod 98 and engaged by follower 117 mounted on the end of pivot arm 118. As shown in Figs. 2 and 5, arm 118 is held in elevated position by collar 116 when the transfer mechanism is in its lowermost position. When the transfer mechanism and piston rod shift upwardly, cam collar 116 shifts out of engagement with follower 117, permitting arm 118 to move downwardly to close the switch. As will be later seen the closing of switch 115 serves to hold the solenoid of valve 100 in energized condition throughout most of the transfer cycle.

The electrical control circuits

Figures 4, 6, 13:
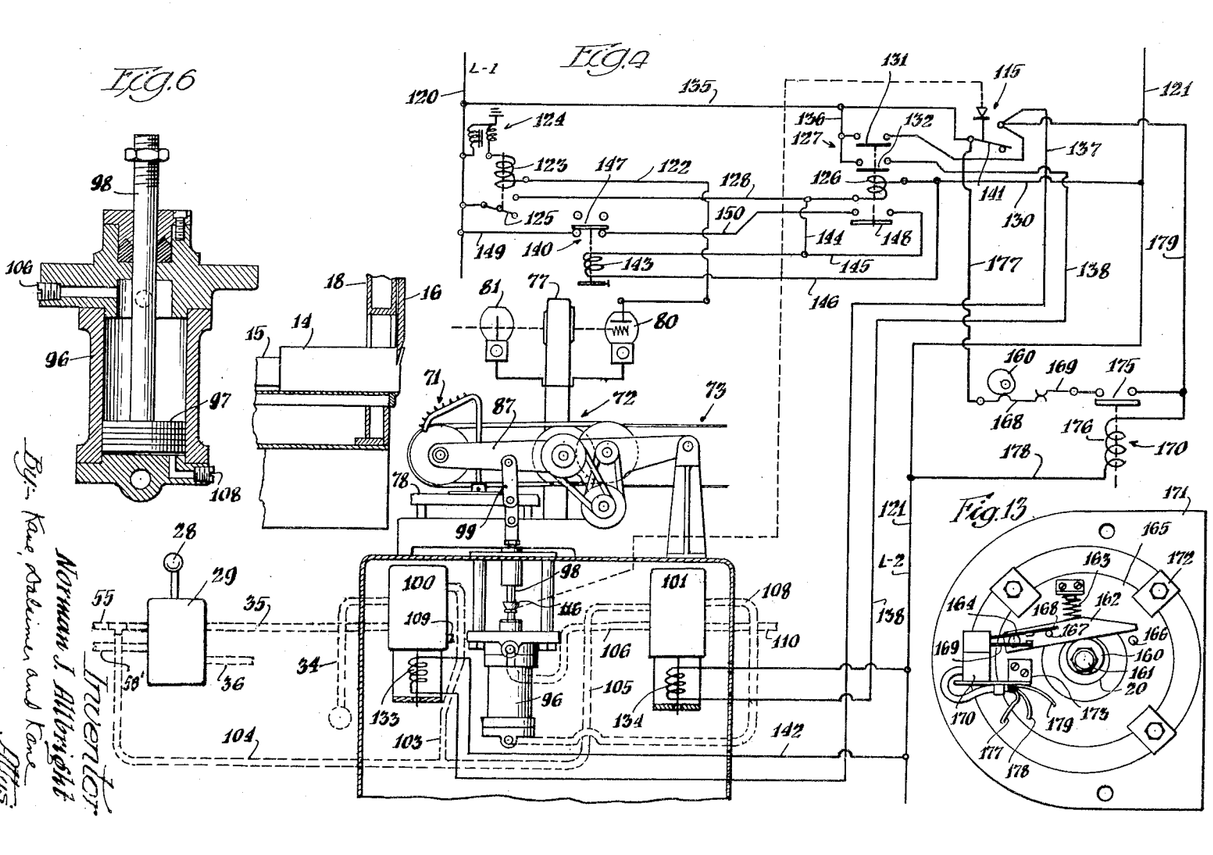
Fig. 4 is a diagram of the electrical circuits for controlling the operation of the apparatus and showing schematically the associated mechanical parts of the apparatus.
Fig. 6 is a detailed longitudinal sectional view of the hydraulic cylinder and piston used for activating the transfer mechanism of my apparatus.
Fig. 13 is an elevational view of an attachment which may be used to control the initiation of the slicing operation after each transfer cycle.

The electrical circuits whereby the measuring device causes the interruption of the operation of the feeding mechanism and the relative shifting between the conveyor and receiving platform are shown in Fig. 4. In addition to the electrical circuits, Fig. 4 also shows schematically the related mechanical and hydraulic parts. Thus, the figure shows the scale 77, the receiving platform 71, the transfer conveyor 72 and ribbon conveyor 73. In addition, it shows the control valve 29 for the slicing machine, the solenoid valves 100 and 101, the hydraulic cylinder 96 and the inter-connected mechanical parts and hydraulic fittings.

The two leads 120 and 121 connect to the two sides of a source of electric power. It will be seen that the actuating switch, in this instance photoelectric cell 80, is connected by lead 122 to the winding 123 of photoelectric cell relay 124. When a predetermined amount of slices accumulate on the receiving platform 71 of my apparatus, the pointer of the scale 77 is caused to interrupt the light beam with the result that relay 124 is energized closing switch 125 thereby energizing the winding 126 of relay 127 through lead 120, switch 125, lead 128, winding 126, lead 130 and lead 121.

When relay 127 is energized, it closes switches 131 and 132 thereby energizing the windings 133 and 134 of solenoids 100 and 101 through leads 135 and 136, switches 131 and 132 and leads 137 and 138.

When solenoid 133 is energized, valve 100 shifts to the position indicated in Fig. 10, with the result that the flow of hydraulic fluid under pressure to control valve 29 of the slicing machine is shut off and the operation of the feeder bar which feeds the meat product to the slicing blade is immediately interrupted. At the same time, the hydraulic fluid is caused to flow from valve 100 through lines 103 and 105 to solenoid valve 101 which has also been energized and caused to shift to the position shown in Fig. 12, with the result that the fluid flows outwardly from valve 101 through line 108 to the lower end of hydraulic cylinder 96 causing the piston 97 to shift upwardly. This, of course, results in elevating the frame 87 and the transfer conveyor 72.

The transfer conveyor shifts to a level above the level of the receiving platform 71 picking up the slices on the receiving platform and transferring them to the ribbon conveyor 73. It will be appreciated that when the transfer belt picks up the meat product, the weight on the receiving platform and scale is immediately relieved with the result that the scale pointer shifts out of the light beam and the light beam is once again focused on the photoelectric cell 80, de-energizing relay 124. In order to continue the energization of the solenoids 133 and 134 of solenoid valves 100 and 101 for different predetermined periods beyond the time of transfer to the transfer conveyor 72, I provide the micro-switch 115 which, it will be recalled, is closed when the piston rod shifts upwardly, and also the delayed operation relay 140.

The micro-switch 115 is connected in parallel with the switch 131. The movable contact 141 of the micro-switch is normally held open due to the engagement between follower 117 and cam collar 116. When the piston rod 98 shifts upwardly, the collar moves out of engagement with the follower 17 with the result that the circuit to solenoid winding 133 is completed through leads 120, 135, switch 115, lead 137, winding 133 and leads 142 and 121. Thus, solenoid winding 133 will remain energized and valve 100 will remain in the position shown in Fig. 10 interrupting the flow of hydraulic fluid to control valve 29 and directing the flow of such fluid to solenoid valve 101 during the entire transfer cycle while piston 97, piston rod 98 and the transfer mechanism shifts upwardly to its uppermost position and then again shifts downwardly to its initial or normal position.

The winding 143 of time delay relay 140 is energized as soon as photoelectric cell 124 is energized through lead 120, switch 125, leads 128, 144 and 145, winding 143 and leads 146, 130 and 121. The relay is of the time delay type and is adjusted so that switch 147 is normally closed and does not open until after the transfer conveyor 72 has shifted upwardly to lift the slices from the receiving platform 71 and move them away from the receiving platform so that they will not again be redeposited thereon when the transfer conveyor is lowered.

Upon the operation of the relay 127, the circuit of winding 143 of time delay relay 140 is locked in and completed independent of photoelectric cell relay 124 and the circuit winding 126 of relay 127 is also completed independent of relay 124. Thus, it will be seen that, in addition to switches 131 and 132, relay 127 also includes switch 148 which is normally open. Upon the operation of relay 127, switch 148 closes and the winding 143 of relay 140 is then completed through leads 120 and 149, switch 147, lead 150, switch 148, lead 145, winding 143 and leads 146, 130 and 121. Winding 126 of relay 127 is energized through leads 120 and 149, switch 147, lead 150, switch 148, leads 145, 144 and 128, winding 126 and leads 130 and 121. Thus, as long as switch 147 of time delay relay 140 remains closed, relay 127 will remain closed with the result that solenoid 134 will remain energized and valve 101 will be in the position shown in Fig. 12 which causes the piston to shift upwardly in the cylinder holding and retaining the transfer conveyor in its elevated position.

Upon the operation of time delay relay 140, switch 147 will open de-energizing the windings of relays 140 and 127 which, in turn, results in de-energizing the solenoid 134 and causing valve 101 to resume its normal position as shown in Fig. 11. The hydraulic fluid under pressure will then leave valve 101 through line 106 and enter the upper portion of the cylinder, causing piston 97 to shift downwardly. The fluid on the lower pressure side of the cylinder will return to valve 101 through line 108 and re-enter the supply tank through line 110.

Due to the provision of the micro-switch 115, solenoid 133 of valve 100 remains energized until collar 116 again engages follower 117 and opens the switch. Thus, the flow of hydraulic fluid under pressure from valve 100 through valve 101 and line 106 to the upper part of the cylinder 96 is insured until the transfer mechanism is returned to its normal operating position. The interruption of the operation of the feed mechanism of the slicing machine is also assured since no hydraulic fluid under pressure flows from valve 100 to control valve 29 as long as solenoid 133 remains energized.

When micro-switch 115 is open and resumes the position indicated diagrammatically in Fig. 4, the valve 100 will resume the de-energized position shown in Fig. 9 with the result that hydraulic fluid under pressure can flow from valve 100 through line 35 to control valve 29 causing the resumption of the feeding operation of the slicing machine. Slices from the slicing machine are once again deposited on the receiving platform 71 and the cycle of operation is continuously repeated.

I have found that it is desirable under certain circumstances to cause the feeding operation of the slicing machine to resume after each cycle of operation at a point where the slicing blade initiates a new and complete slicing operation. This prevents small scraps from being cut by the blade during the initial cutting operation of each cycle and this can be accomplished by the apparatus shown in Fig. 13 and the electrical connections indicated in Fig. 4.

As previously explained, the rotary slicing blade 16 is mounted on a suitable shaft 20. At the opposite end of the shaft 20 from the blade, I provide an eccentric cam 160 suitably held in place as by a machine screw 161. The cam engages a pivotally mounted arm 162 which is urged into engagement with the cam by spring 163. Follower arm 162 is pivotally mounted at 164 on the disc 165. A suitable stop 166 is preferably provided on the disc adjacent the free end of the follower arm to limit the shift movement in one direction. At an intermediate portion, the follower arm is provided with a pin 167 which engages movable contact 168. When the dwell portion of the cam engages follower arm 162 the follower arm shifts movable contact 168 out of engagement with fixed contact 169 breaking the circuit to quick operating relay 170. The disc 165 is mounted for rotatable adjustment on attaching plate 171 by means of lugs 172 and the attaching plate 171 is in turn mounted on the support for shaft 20.

The electrical circuit of the switch 168—169 and relay 170 is shown at the right-hand side of the diagram in Fig. 4. Thus, it will be seen that movable contact 168, fixed contact 169, relay control switch 175 and relay winding 176 are connected in series with each other by means of leads 120, 135 and 177, and leads 178 and 121. It will also be seen that movable contact 168, fixed contact 169 and switch 175 are connected in parallel with micro-switch 115 by means of leads 177 and 179.

As long as micro-switch 115 remains closed i. e., while the transfer mechanism is elevated, the winding 176 of relay 170 remains energized through micro-switch 115, lead 179, winding 176 and leads 178 and 121. After the transfer mechanism is lowered to its initial position and micro-switch 115 opens, the winding 176 of relay 170 is energized through lead 177, movable contact 168, fixed contact 169 and switch 175. In addition, winding 133 of solenoid valve 100 will remain energized through leads 179 and 137, with the result that the operation of the feed mechanism remains interrupted. When the rotary slicing blade rotates to the desired position for the resumption of the cutting operation cam 160 causes follower arm 162 to open contact 168 with the result that the relay winding 176 is deenergized and switch 175 is caused to open. Relay 170 cannot again be re-energized until micro-switch 115 again closes. The opening of switch 176 of course causes the de-energization of the solenoids 133 of valve 100 with the result that the feeding operation of the slicing machine is again resumed. The adjustable attaching disc 165 can be rotatably shifted or adjusted so as to cause the opening of contact 168 at the proper position, initiating the slicing operation at the beginning of each cycle at the proper time to insure a full initial slice of meat.

*Operation*

My improved apparatus 10 is combined with slicing machine 11 at the discharge end thereof so that the sliced product coming from the slicing machine will be discharged on the receiving platform 71. The control switch of the apparatus (not shown) is turned on so as to cause the continuous operation of the transfer conveyor 72 and the ribbon conveyor 73. The measuring apparatus which, in this case is scale 77, is adjusted to measure the desired predetermined quantity of the sliced products to be segregated. The product to be sliced is then placed in the slicing machine and the slicing machine is set into operation so as to cause the feed mechanism to feed the product to the rotary slicing blade causing the slices to be deposited on the receiving platform 71.

When the desired predetermined quantity of slices have been accumulated on the receiving platform the switch mechanism, in this case photoelectric cell 80, is operated so as to cause the energization of relay 124 which, in turn, energizes relay 127 and time delay relay 140. The energization of relay 127 in turn causes the operation of the solenoid valves 100 and 101, with the result that the feeding operation of the slicing machine is interrupted and the transfer mechanism is elevated. Upon the elevation of the transfer mechanism, micro-switch 115 closes with the result that the circuit for solenoid valve 100 will remain energized until the completion of the transfer cycle. Time delay relay 140 is adjusted to open when the slices have been transferred from the receiving platform 71 and will no longer be redeposited thereon when the transfer mechanism is lowered to its initial position. Upon the opening of time delay relay the transfer mechanism is caused to lower and when it reaches its initial position switch 115 again opens de-energizing the winding of solenoid valve 100 causing hydraulic fluid under pressure to again flow to control valve 29.

Where my improved slicing control mechanism shown in Fig. 13 is employed, then the circuit of solenoid valve 100 will remain closed, even after the transfer mechanism is lowered to its initial position, until the rotary slicing blade reaches the correct position for resumption of the slicing operations. Through the action of cam 160, contact 168 and relay 170, the circuit of solenoid valve 100 is then interrupted and the feeding mechanism for the slicing machine will resume operation. The cycle of operation is continuously repeated until the product to be sliced is entirely consumed. As each predetermined quantity of the sliced product is carried away by the transfer conveyor it is in turn transferred to the ribbon conveyor and is thereby segregated from the other sliced products coming from the slicing machine. An operator may be stationed to wrap each segregated quantity from the apparatus.

It will thus be seen that I have provided improved apparatus for measuring and segregating predetermined quantities of sliced products coming from a slicing machine which is flexible and may be readily adjusted; which may be used with different types of food products; which does not interfere with the manual control of the slicing machine to which it is applied; which is relatively simple and sturdy in construction so that it is simple to manufacture, assemble and use and requires a minimum amount of repair; which is arranged so that the slicing operation may be resumed after each cycle of operation without any small scraps of sliced product; and in which the food engaging parts are accessible and can be readily cleaned.

Modifications may, of course, be made in the illustrated and described embodiment of my invention without departing from the invention as set forth in the accompanying claims.

I claim:

1. Improved measuring and segregating apparatus for use in combination with a slicing machine of the type which includes a rotatable shaft, an eccentric slicing blade mounted on the shaft, means for rotating the rotatable shaft, a reciprocally mounted feeder arm for feeding the product to be sliced to the slicing blade and a primary hydraulic system including a source of hydraulic fluid under pressure and a primary control valve for causing the feeder arm to shift, said measuring and segregating apparatus comprising: a supporting structure; a receiving platform supported by said supporting structure adjacent the discharge end of the slicing machine so as to receive the sliced product coming therefrom; a secondary hydraulic system including a secondary control valve having means for connecting the secondary control valve to the source of hydraulic fluid under pressure and to the primary control valve of the primary hydraulic system; and measuring means associated with the apparatus and operatively connected to the secondary control valve to cause the secondary control valve to shut off the supply of fluid to the primary control valve and thereby cause cessation of operation of the feeder arm when a predetermined quantity of the sliced product has been accumulated on the receiving platform.

2. The combination as set forth in claim 1 having a cam and follower operatively connected to the rotatable shaft of the slicing machine to be operated thereby and an operative connection between the cam and follower and the secondary control valve to cause the secondary control valve to continue shutting off the supply of fluid to the primary control valve until the shaft and slicing blade rotate to a predetermined position.

3. Improved measuring and segregating apparatus for use in combination with a slicing machine as set forth in claim 1 in which a switch is disposed in operative relationship to the rotatable shaft of the slicing machine so as to be operated when the shaft and slicing blade rotate to a predetermined position and electrical connections are provided between said switch and said secondary control valve to cause the secondary control valve to continue shutting off the supply of fluid until said predetermined position of the shaft and slicing blade is reached.

4. Improved measuring and segregating apparatus for use in combination with a slicing machine of the type which includes a rotatable shaft, an eccentric slicing blade mounted on the shaft, means for rotating the rotatable shaft, a reciprocally mounted feeder arm for feeding the product to be sliced to the slicing blade and a primary hydraulic system including a source of hydraulic fluid under pressure and a primary control valve for causing the feeder arm to shift, said measuring and segregating apparatus comprising: a supporting structure; a receiving platform supported by said supporting structure adjacent the discharge end of the slicing machine so as to receive the sliced product coming therefrom; a transfer conveyor mounted on said supporting structure adjacent the receiving platform and shiftable between normal inoperative position to operative transfer position to engage and transfer the sliced product accumulated on the receiving platform; means including a hydraulic cylinder and piston for shifting the transfer conveyor between operative and inoperative positions; a secondary hydraulic system including a secondary control valve supported by the supporting structure and having means for connecting the secondary control valve to the source of hydraulic fluid under pressure and to the primary control valve of the primary hydraulic system and to opposite ends of the hydraulic cylinder; measuring means including an electric switch operatively connected to the receiving platform so as to operate the electric switch when a predetermined quantity of sliced product is accumulated on the receiving platform; and means including electrical circuits connected between the said switch and the secondary control valve to cause the secondary control valve upon the operation of said switch to shut off the supply of fluid to the primary control valve and thereby cause cessation of operation of the feeder arm and to direct a flow of hydraulic fluid to one end of the hydraulic cylinder to shift the transfer conveyor to operative position whereby the operation of the slicing machine is halted and the transfer conveyor transfers the sliced product from the receiving platform when a predetermined quantity of the sliced product is accumulated thereon.

5. The combination as set forth in claim 4 having a time delay relay in the electrical circuits connected between the switch and the secondary control valve so as to cause the secondary control valve to continue shutting off the supply of fluid to the primary control valve and to direct a flow of fluid to the said end of the hydraulic cylinder for a predetermined period of time after sliced product has been transferred from the receiving platform and having a cam and follower operatively connected to the rotatable shaft of the slicing machine to be operated thereby and an operative connection between the cam and follower and the secondary control valve so as to cause the secondary control valve to continue shutting off the supply of fluid to the primary control valve and directing the flow of fluid to the said end of the hydraulic cylinder until the shaft and slicing blade rotate to a predetermined position.

6. Improved measuring and segregating apparatus for use in combination with a slicing machine of the type which includes a rotatable shaft, an eccentric slicing blade mounted on the shaft, means for rotating the rotatable shaft, a reciprocally mounted feeder arm for feeding the product to be sliced to the slicing blade and a primary hydraulic system including a source of hydraulic fluid under pressure and a feeder control valve for causing the feeder arm to shift, said measuring and segregating apparatus comprising: a supporting structure; a receiving platform supported by said supporting structure adjacent the discharge end of the slicing machine so as to receive the sliced product coming therefrom; a transfer conveyor disposed in intermeshed relationship with the receiving platform and extending outwardly therefrom, said transfer conveyor being shiftable from a normal inoperative position disposed in a lower horizontal plane than the receiving platform to an operative transfer position disposed in a higher horizontal plane than the receiving platform; means including a hydraulic cylinder and piston for shifting the transfer conveyor between operative and inoperative positions; measuring means including an electric switch operatively connected to the receiving platform so as to cause the switch to operate when a predetermined quantity of sliced product accumulates on the receiving platform; a secondary hydraulic system including a first solenoid control valve supported by the supporting structure and having means for connecting it to the source of hydraulic fluid under pressure and to the feeder control valve of the primary hydraulic system and a second solenoid control valve also supported by the supporting structure and connected to the first solenoid control valve and having separate connections to the opposite ends of the hydraulic cylinder; and means including electrical circuits and relays connected between the said switch of the measuring means and the first and second solenoid control valves so as to cause, on the operation of the switch, the first control valve to shut off the supply of fluid to the feeder control valve and thereby cause cessation of operation of the feeder arm and so as to cause the first and second control valves to direct the flow of fluid to one end of the cylinder to cause it to shift the transfer conveyor to operative position whereby the operation of the slicing machine is halted and the sliced product accumulated on the receiving platform is transferred when a predetermined quantity of sliced product is accumulated on the receiving platform.

7. The combination as set forth in claim 6 in which the electrical circuits connected between the switch of the measuring means and the first and second solenoid control valves includes a time delay relay for causing the first control valve to continue shutting off the supply of fluid to the feeder control valve and to cause the first and second control valves to continue directing the flow of fluid to the said end of the hydraulic cylinder for a predetermined period of time after the sliced product is transferred from the receiving platform and the combination also has a cam and follower operatively connected to the rotatable shaft to be operated thereby and having an operative connection with the first control valve to cause said first control valve to continue shutting off the supply of fluid to the feeder control valve until the shaft and slicing blade are rotated to a predetermined position.

8. Apparatus for use with a slicing machine for measuring and segregating into predetermined quantities the sliced product coming from the machine comprising: a supporting structure; a receiving platform in the form of a plurality of proximately positioned, relatively stationary and rigid bars supported on the supporting structure and having portions forming a platen for receiving the sliced product discharged from hte slicing machine, said platen being disposed at an angle inclining downwardly towards the leading edge; and a transfer conveyor in the form of a plurality of proximately positioned parallel endless belts supported from said supporting structure on rotatable pulleys with one end of said belts being arranged in intermeshed relationship with the bars of hte receiving platform and with the other end of the belts projecting outwardly therefrom, said receiving platform and transfer conveyor being normally positioned so that the transfer conveyor is in a lower horizontal plane than the platen portion but being relatively shiftable to transfer position in which the transfer belt is in a higher horizontal plane than the platen portion.

9. Apparatus for use with a slicing machine for measuring and segregating into predetermined quantities the sliced product coming from the slicing machine as set forth in claim 8 in which the platen portion of the rigid bars forming the receiving platform are formed with projections on the upper surface thereof to engage and frictionally retain the sliced product deposited thereon.

10. Improved measuring and segregating apparatus for use in combination with a slicing machine of the type which includes a rotatable shaft, an eccentric slicing blade mounted on the shaft, means for rotating the rotatable shaft, a reciprocally mounted feeder arm for feeding the product to be sliced to the slicing blade and a primary hydraulic system including a source of hydraulic fluid under pressure and a primary control valve for causing the feeder arm to shift, said measuring and segregating apparatus comprising: a supporting structure; a receiving platform supported by said supporting structure adjacent the discharge end of the slicing machine so as to receive the sliced product coming therefrom; a secondary hydraulic system including a secondary control valve having means for connecting the secondary control valve to the source of hydraulic fluid under pressure and to the primary control valve of the primary hydraulic system; measuring means including an electric switch operatively connected to the receiving platform so as to operate the electric switch when a predetermined quantity of sliced product is accumulated on the receiving platform; and means including electrical circuits connected between the said switch and the secondary control valve to cause the secondary control valve, upon the operation of said switch, to shut off the supply of fluid to the primary control valve and thereby cause cessation of operation of the feeder arm when a predetermined quantity of the sliced product has been accumulated on the receiving platform.

11. Improved measuring and segregating apparatus for use in combination with a slicing machine as set forth in claim 10 in which a switch is disposed in operative relationship to the rotatable shaft of the slicing machine so as to be operated when the shaft and slicing blade rotate to a pre-determined position and electrical connections are provided between said switch and said secondary control valve to cause the secondary control valve to continue shutting off the supply of fluid until said pre-determined position of the shaft and slicing blade is reached.

12. Improved measuring and segregating apparatus for use in combination with a slicing machine of the type which includes an eccentric slicing blade and supporting shaft assembly mounted for rotary motion, means for rotating the slicing blade and shaft assembly, a reciprocally mounted feeder for feeding the product to be sliced to the slicing blade and drive means for causing the feeder arm to operate, said measuring and segregating apparatus comprising: a supporting structure; a receiving platform supported by said supporting structure adjacent the discharge end of the slicing machine so as to receive the sliced product coming therefrom; weighing means operatively connected to the receiving platform and responsive to the quantity of sliced product deposited thereon; control means having operative connection between the weighing means and the drive means of the feeder arm of the slicing machine so as to cause cessation of the operation of the feeder arm when a pre-determined quantity of the sliced product is deposited thereon, said control means including means for re-initiating the operation of the feeder arm; and further control means in operative relation to the slicing blade and supporting shaft assembly for delaying the re-initiation of the operation of the feeder arm until the blade rotates to a pre-determined position.

13. Improved measuring and segregating apparatus for use in combination with a slicing machine as set forth in claim 12 in which the further control means includes an electric switch operated by the slicing blade and supporting shaft assembly to be actuated when the blade is rotated to a pre-determined position and having electrical connection to the first-mentioned control means.

References Cited in the file of this patent
UNITED STATES PATENTS

| | | |
|---|---|---|
| 1,993,586 | Bech | Mar. 5, 1935 |
| 2,642,910 | Garapolo | June 23, 1953 |